US012135129B2

(12) United States Patent
Ichihashi et al.

(10) Patent No.: US 12,135,129 B2
(45) Date of Patent: Nov. 5, 2024

(54) EFFUSION COOLING FOR DILUTION/QUENCH HOLE EDGES IN COMBUSTOR LINER PANELS

(71) Applicant: RAYTHEON TECHNOLOGIES CORPORATION, Farmington, CT (US)

(72) Inventors: Fumitaka Ichihashi, Unionville, CT (US); James B. Hoke, Tolland, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/861,878

(22) Filed: Jul. 11, 2022

(65) Prior Publication Data

US 2022/0364728 A1 Nov. 17, 2022

Related U.S. Application Data

(62) Division of application No. 16/513,477, filed on Jul. 16, 2019, now Pat. No. 11,391,460.

(51) Int. Cl.
*F23R 3/00* (2006.01)
*F01D 25/12* (2006.01)

(52) U.S. Cl.
CPC .............. *F23R 3/002* (2013.01); *F01D 25/12* (2013.01); *F05D 2220/323* (2013.01); *F05D 2240/35* (2013.01); *F05D 2260/20* (2013.01); *F23R 2900/03041* (2013.01)

(58) Field of Classification Search
None
See application file for complete search history.

(56) References Cited

U.S. PATENT DOCUMENTS

| 5,794,449 A * | 8/1998 | Razdan ................ F23R 3/286 |
| | | 60/737 |
| 6,145,319 A | 11/2000 | Burns et al. |
| 7,631,502 B2 | 12/2009 | Burd et al. |
| 2003/0182942 A1 | 10/2003 | Gerendas |
| 2003/0213250 A1* | 11/2003 | Pacheco-Tougas ....... F23R 3/60 |
| | | 60/752 |
| 2006/0032229 A1* | 2/2006 | Anderson ............... F23R 3/002 |
| | | 60/754 |

(Continued)

FOREIGN PATENT DOCUMENTS

EP  3633269  4/2020

OTHER PUBLICATIONS

European Patent Office, European Office Action dated Oct. 6, 2022 in Application No. 20185991.5.

(Continued)

*Primary Examiner* — Edwin Kang
(74) *Attorney, Agent, or Firm* — SNELL & WILMER L.L.P (57) ABSTRACT

A gas turbine engine component includes a first surface and a second surface. The component further includes a dilution hole defined by the first surface and the second surface. The component further includes a first effusion hole and a second effusion hole each having an inlet defined by the second surface and an outlet defined by the first surface such that the outlet of the first effusion hole is located nearer to the dilution hole than the outlet of the second effusion hole.

12 Claims, 6 Drawing Sheets

(56) References Cited

U.S. PATENT DOCUMENTS

| | | | |
|---|---|---|---|
| 2006/0272335 A1 | 12/2006 | Schumacher et al. | |
| 2014/0102106 A1* | 4/2014 | Snyder | F23R 3/002 |
| | | | 60/752 |
| 2016/0201913 A1 | 7/2016 | Tu | |
| 2016/0208704 A1 | 7/2016 | Bouldin | |
| 2016/0238250 A1* | 8/2016 | Moura | F23R 3/06 |
| 2016/0238253 A1 | 8/2016 | Moura | |
| 2016/0265773 A1* | 9/2016 | Moura | F23R 3/005 |
| 2018/0142563 A1 | 5/2018 | Commaret et al. | |
| 2019/0048799 A1 | 2/2019 | Kishida | |

OTHER PUBLICATIONS

USPTO; Pre-Interview First Office Action dated Jan. 28, 2021 in U.S. Appl. No. 16/513,477.
European Patent Office, European Search Report dated Nov. 5, 2020 in Application No. 20185991.5.
USPTO; Advisory Action dated Jul. 27, 2021 in U.S. Appl. No. 16/513,477.
USPTO; Final Rejection dated Apr. 27, 2021 in U.S. Appl. No. 16/513,477.
USPTO; Requirement for Restriction dated Oct. 27, 2020 in U.S. Appl. No. 16/513,477.
USPTO; Notice of Allowance dated Mar. 21, 2022 in U.S. Appl. No. 16/513,477.

* cited by examiner

EFFUSION COOLING FOR DILUTION/QUENCH HOLE EDGES IN COMBUSTOR LINER PANELS

CROSS-REFERENCE TO RELATED APPLICATIONS

This application is a divisional of, and claims priority to and the benefit of, U.S. application Ser. No. 16/513,477, filed Jul. 16, 2019, and titled "EFFUSION COOLING FOR DILUTION/QUENCH HOLE EDGES IN COMBUSTOR LINER PANELS," which is incorporated herein by reference in its entirety for all purposes.

FIELD

The present disclosure relates generally to gas turbine engines and, more particularly, to a liner and shell assembly of a combustor section of a gas turbine engine having effusion holes oriented proximate to a dilution hole.

BACKGROUND

Gas turbine engines include compressor sections to compress an airflow, combustor sections that combine the airflow with fuel for combustion and generate exhaust, and turbine sections that convert the exhaust into torque to drive the compressor sections. The combustor sections may include a liner and shell assembly which may include an outer shell and an inner panel. The panel may define a dilution hole extending therethrough.

SUMMARY

Described herein is a gas turbine engine component. The component includes a first surface and a second surface. The component further includes a dilution hole defined by the first surface and the second surface. The component further includes a first effusion hole and a second effusion hole each having an inlet defined by the second surface and an outlet defined by the first surface such that the outlet of the first effusion hole is located nearer to the dilution hole than the outlet of the second effusion hole.

In any of the foregoing embodiments, the inlet of the first effusion hole is located at a same distance from the dilution hole as the inlet of the second effusion hole.

Any of the foregoing embodiments may further include a grommet defined by the second surface, wherein the inlet of the first effusion hole and the inlet of the second effusion hole are both defined by the grommet.

In any of the foregoing embodiments, the inlet of the first effusion hole is located nearer to the dilution hole than the inlet of the second effusion hole.

Any of the foregoing embodiments may further include a tangential effusion hole extending at a tangential angle relative to the first effusion hole and the second effusion hole that is between 60 degrees and 120 degrees, the tangential effusion hole having a tangential inlet defined by the second surface and a tangential outlet defined by the first surface.

In any of the foregoing embodiments, the tangential outlet is aligned with the inlet of the first effusion hole.

In any of the foregoing embodiments, the gas turbine engine component is a panel that at least partially defines a combustion chamber of a gas turbine engine such that the first surface is exposed to combustion in the combustion chamber.

In any of the foregoing embodiments, the outlet of the first effusion hole and the outlet of the second effusion hole are closer to the dilution hole than the inlet of the first effusion hole and the inlet of the second effusion hole, respectively.

In any of the foregoing embodiments, the first effusion hole and the second effusion hole each form an angle with a respective portion of the dilution hole that is between 80 degrees and 100 degrees.

Also disclosed is a gas turbine engine component. The component includes a first surface and a second surface. The component further includes a dilution hole defined by the first surface and the second surface. The component further includes a first effusion hole and a second effusion hole each forming an angle with a respective portion of the dilution hole that is between 80 degrees and 100 degrees, having an inlet defined by the second surface, and having an outlet defined by the first surface such that the outlet of the first effusion hole is located nearer to the dilution hole than the outlet of the second effusion hole.

In any of the foregoing embodiments, the inlet of the first effusion hole is located at a same distance from the dilution hole as the inlet of the second effusion hole.

Any of the foregoing embodiments may further include a grommet defined by the second surface, wherein the inlet of the first effusion hole and the inlet of the second effusion hole are both defined by the grommet.

In any of the foregoing embodiments, the inlet of the first effusion hole is located nearer to the dilution hole than the inlet of the second effusion hole.

Any of the foregoing embodiments may further include a tangential effusion hole extending at a tangential angle relative to the first effusion hole and the second effusion hole that is between 60 degrees and 120 degrees, the tangential effusion hole having a tangential inlet defined by the second surface and a tangential outlet defined by the first surface.

In any of the foregoing embodiments, the tangential outlet is aligned with the inlet of the first effusion hole.

In any of the foregoing embodiments, the gas turbine engine component is a panel that at least partially defines a combustion chamber of a gas turbine engine such that the first surface is exposed to combustion in the combustion chamber.

In any of the foregoing embodiments, the outlet of the first effusion hole and the outlet of the second effusion hole are closer to the dilution hole than the inlet of the first effusion hole and the inlet of the second effusion hole, respectively.

Also disclosed is a liner and shell assembly. The assembly includes a shell; and a panel at least partially spaced from the shell to form a gap therebetween. The panel includes a first surface and a second surface. The panel further includes a dilution hole at least partially defined by the first surface and the second surface. The panel further includes a first effusion hole and a second effusion hole each having an inlet located at the gap between the panel and the shell and defined by the second surface, and an outlet defined by the first surface such that the outlet of the first effusion hole is located nearer to the dilution hole than the outlet of the second effusion hole.

In any of the foregoing embodiments, the panel further includes a grommet defined by the second surface of the panel, and wherein the inlet of the first effusion hole and the inlet of the second effusion hole are both located at a same distance from the dilution hole and are both defined by the grommet.

In any of the foregoing embodiments, the panel further includes a tangential effusion hole extending at an angle relative to the first effusion hole and the second effusion hole that is between 60 degrees and 120 degrees, the tangential effusion hole having a tangential inlet defined by the second surface and a tangential outlet defined by the first surface.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
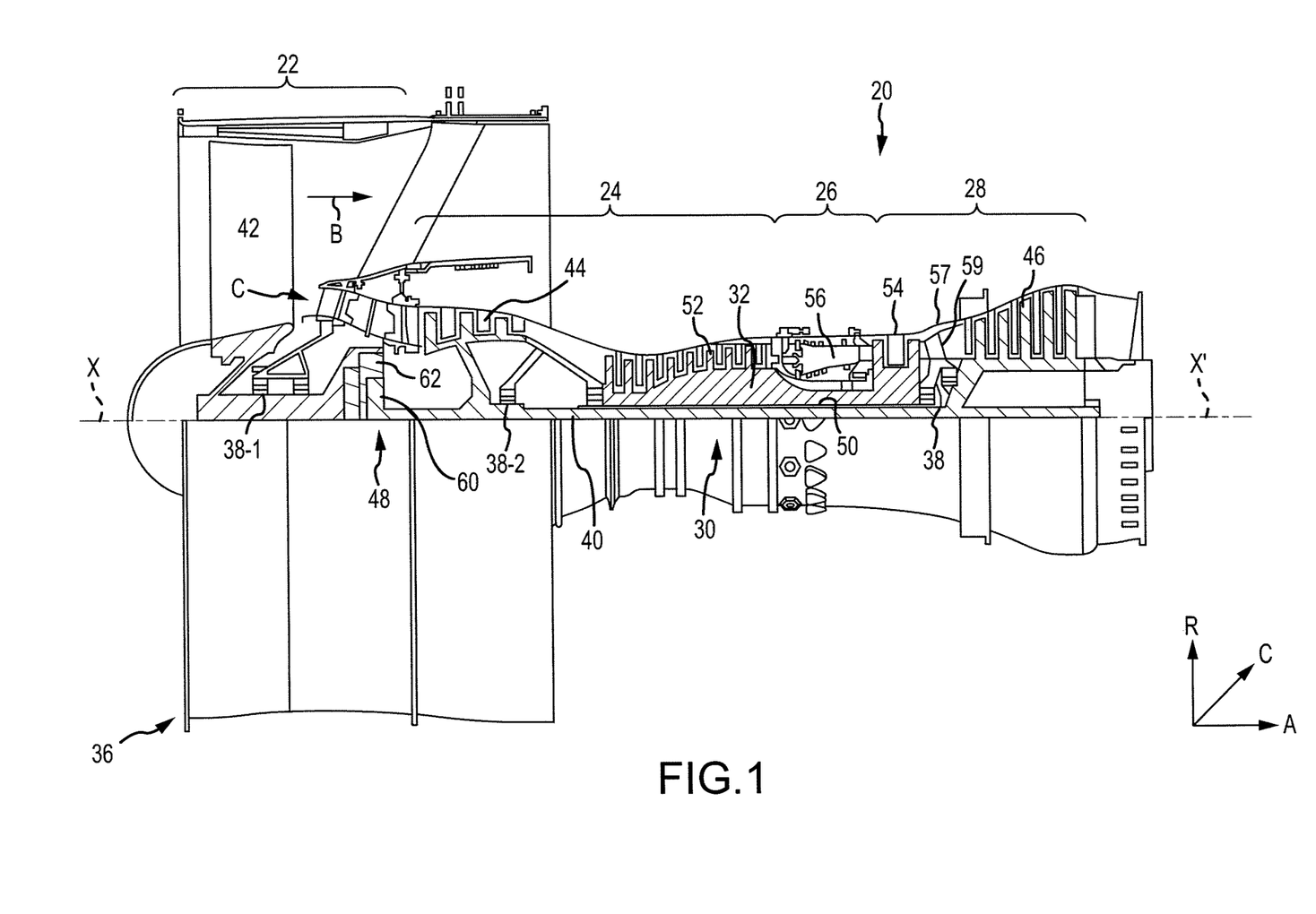
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
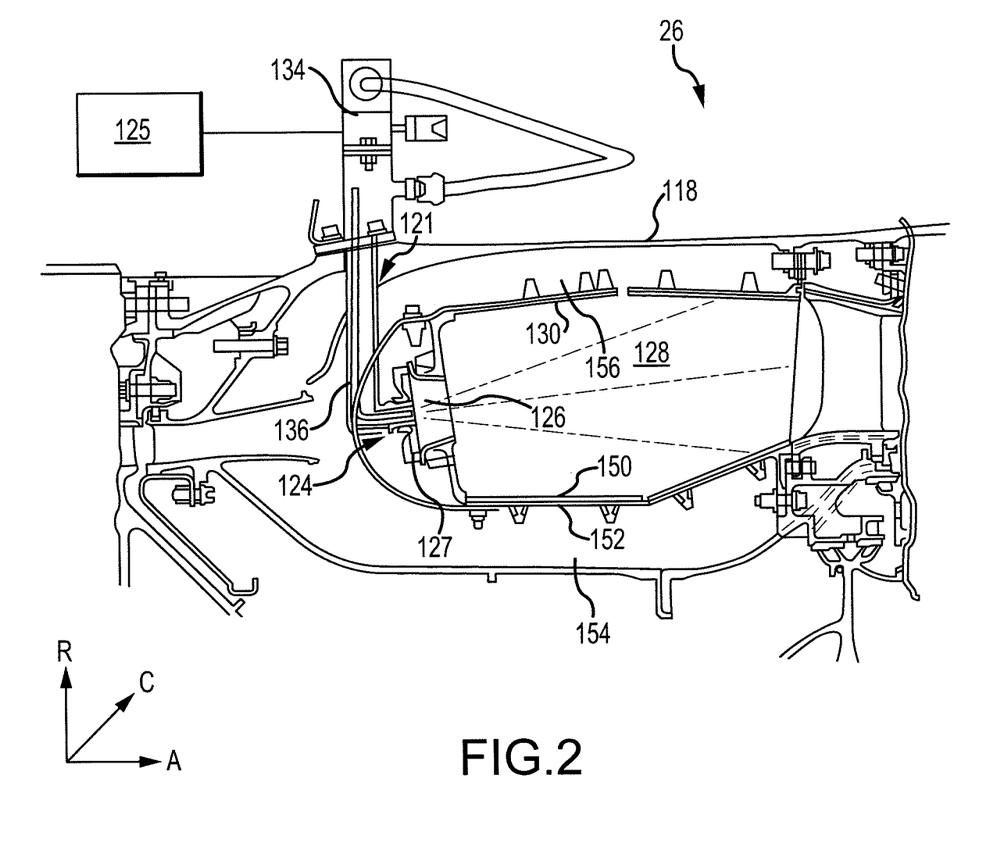
FIG. 2 is a cross-sectional view of a portion of a combustor section of the gas turbine engine of FIG. 1, in accordance with various embodiments.

In various embodiments and referring to FIG. 2, the combustor section 26 may include an annular combustor 132. The annular combustor 132 may include multiple fuel nozzles 124, which each may or may not include their own trim valve 134. In various embodiments, each fuel nozzle 124 delivers fuel to a respective section of the combustion chamber 128. The fuel nozzles 124 may be arranged circumferentially around an axis within a combustor 132. The fuel nozzles 124 may include stems 136 that extend from a diffuser case 118 to openings.

Although a single fuel nozzle 124 (and other components) is shown in the drawings, one skilled in the art will realize that the combustor section 26 may include multiple openings circumferentially around the combustor section 26 that receive fuel nozzles 124.

The combustor section 26 may further include a diffuser case 118. The diffuser case 118 surrounds or encloses a liner and shell assembly 130. The liner and shell assembly 130 may define a combustion chamber 128. A fuel source 125 provides fuel to the fuel nozzle 124 for delivery to the combustion chamber 128. The fuel nozzle 124 extends through an aperture 121 in the diffuser case 118. An end of the fuel nozzle 124 may be arranged at an inlet 126 of the combustion chamber 128. A swirler 127 (which may include a hole) may provide desired airflow motion from the compressor section 24 of FIG. 1 to achieve a desired air/fuel mixture. The liner and shell assembly 130 typically includes one or more igniters used to begin combustion of the air/fuel mixture.

The diffuser case 118 and the liner and shell assembly 130 may define an outer shroud 156 and an inner shroud 154 therebetween. In various embodiments, air or another compressed gas may flow through at least one of the inner shroud 154 or the outer shroud 156. In various embodiments, the fuel nozzle 124 may extend through the outer shroud 156 and may be extended into the inner shroud 154. The inner shroud 154 and the outer shroud 156 may each be referred to as a diffuser chamber 154, 156.

The liner and shell assembly 130 may include a panel 150 and a shell 152. In various embodiments, the panel 150 may be directly or indirectly coupled to the shell 152 to resist movement of the panel 150 relative to the shell 152. The panel 150 may at least partially define the combustion chamber 128, and the shell 152 may be located between the outer shroud 156 and the panel 150, or between the inner shroud 154 and the panel 150.

Figure 3A:
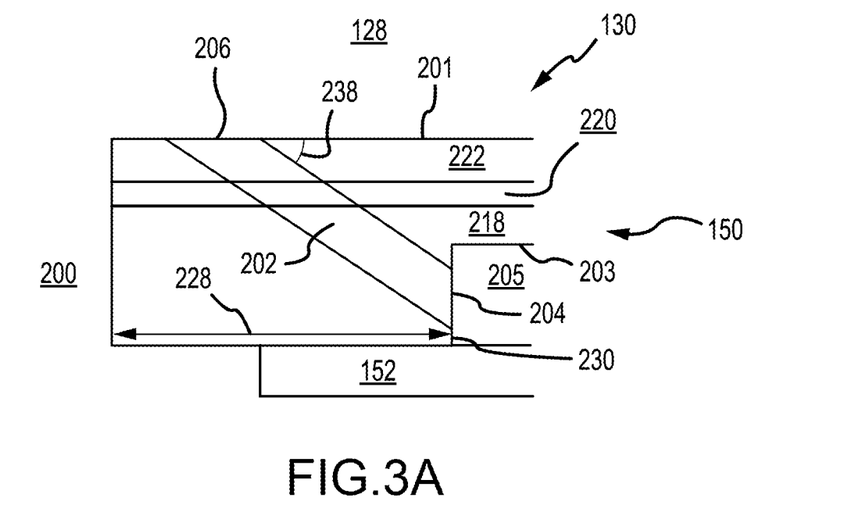
FIGS. 3A and 3B illustrate a cross-sectional view of a portion of a liner and shell assembly of the combustor section of FIG. 2, in accordance with various embodiments.
Figure 3B:
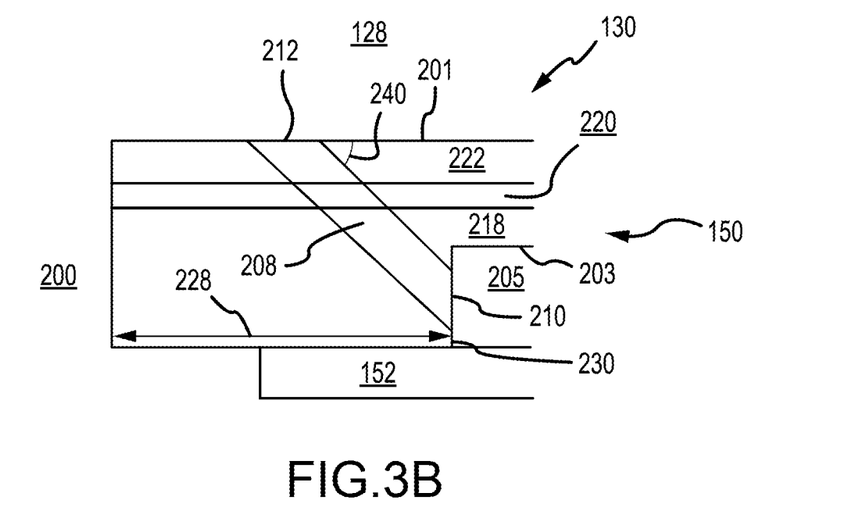
Figure 4:
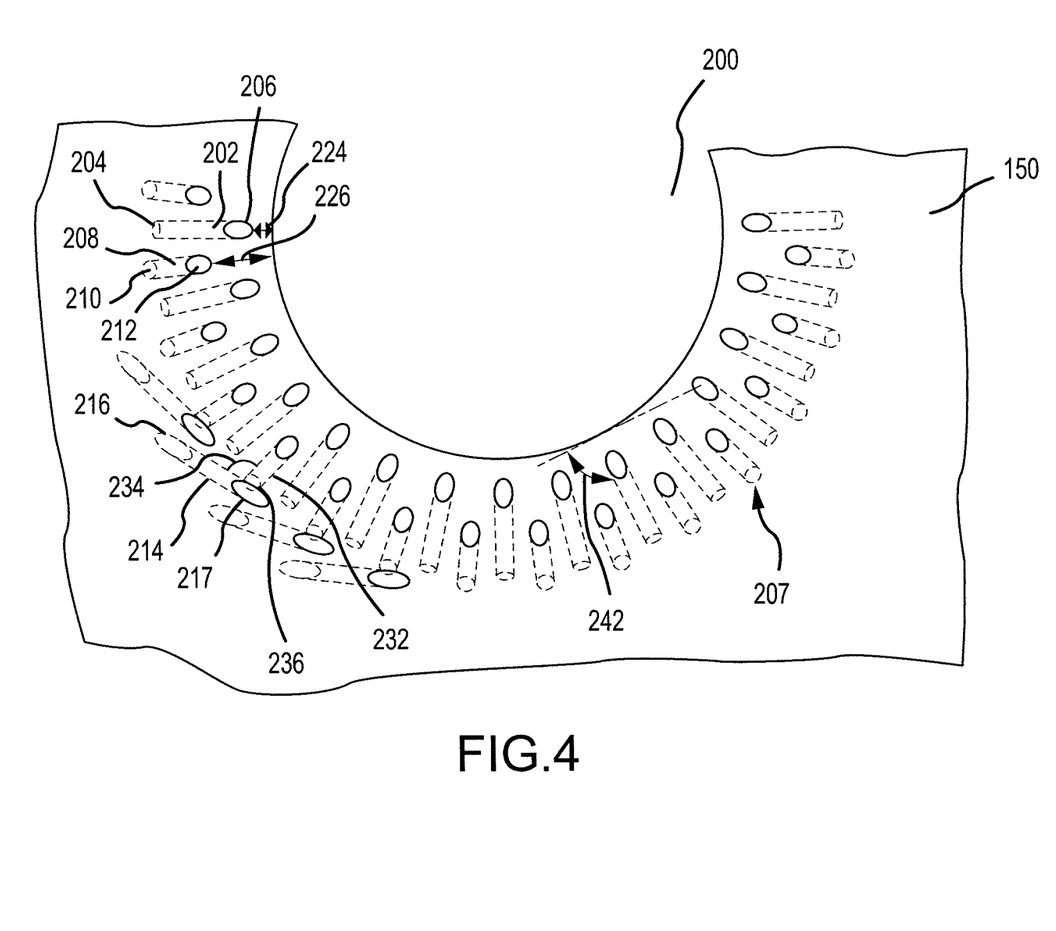
FIG. 4 illustrates a plan view of a portion of the liner and shell assembly of FIG. 2, in accordance with various embodiments.

Referring to FIGS. 3A, 3B, and 4, the panel 150 may include multiple layers. In particular, the panel 150 may include a metal alloy layer 218, a bond coating 220, and a thermal coating 222. The bond coating 220 may bond the thermal coating 222 to the metal alloy layer 218. The thermal coating 222 may include a ceramic or other material that is resistant to heat and may protect the bond coating 220 and the alloy 218 from the relatively great temperatures within the combustion chamber 128. In various embodiments, the panel 150 may or may not include one or both of the bond coating 220 or the thermal coating 222.

The liner and shell assembly 130 may include a gap or volume 205 defined between the panel 150 and the shell 152. A cooling fluid, such as air, may be ported into the gap or volume 205. A plurality of effusion holes 207 may extend through the panel 150. In particular, the plurality of effusion holes 207 may have inlets defined by a second surface 203 of the panel 150 and may have outlets defined by a first surface 201 of the panel 150. The plurality of effusion holes 207 may port the cooling fluid from the gap 205 to the first surface 201 in order to cool the first surface 201.

The liner and shell assembly 130 may define a dilution hole 200 extending therethrough. Additionally, a grommet 230 may be defined by the second surface 203 and may at least partially define the gap or volume 205. The plurality of effusion holes 207 may include a first plurality of effusion holes including a first effusion hole 202, and a second plurality of effusion holes including a second effusion hole 208. The first effusion hole 202 may have an inlet 204 defined by the grommet 230, and an outlet 206 defined by the first surface 201 of the panel 150. The second effusion hole 208 may have an inlet 210 also defined by the grommet 230, and an outlet 212 defined by the first surface 201 of the panel 150. Because the inlets 204, 210 are both located on the grommet 230, both inlets 204, 210 are located an equal distance 228 from the dilution hole 200.

The outlet 206 of the first effusion hole 202 may be located a first distance 224 from the dilution hole 200, and the outlet 212 of the second effusion hole 208 may be located a second distance 226 from the dilution hole 200. In various embodiments, the first distance 224 may be less than the second distance 226. For example, the first distance 224 may be between 0.001 inches and 0.05 inches (0.0254 millimeters (mm) and 1.27 mm), between 0.01 inches and 0.03 inches (0.254 mm and 0.762 mm), or about 0.02 inches (0.508 mm). Where used in this context, about refers to the referenced value plus or minus 10 percent (10%) of the referenced value. The second distance 226 may be between 0.01 inches and 0.3 inches (0.254 mm and 7.62 mm), between 0.025 inches and 0.125 inches (0.635 mm and 3.175 mm), or about 0.075 inches (1.905 mm). In that regard, the first effusion hole 202 may provide a flow of coolant to a location of the panel 150 that is closer to the dilution hole 200 than the coolant provided by the second effusion hole 208, thus distributing cooling of the panel 150 relatively evenly at locations proximate to the dilution hole 200.

In order to allow the first outlet 206 to be closer to the dilution hole 200 than the second outlet 212, the first effusion hole 202 may form an angle 238 with the first surface 201 that is less than an angle 240 formed between the second effusion hole 208 and the first surface 201. In various embodiments, the first angle 238 may be between 20 degrees and 45 degrees, between 30 degrees and 35 degrees, or about 32.5 degrees. In various embodiments, the second angle 240 may be between 35 degrees and 55 degrees, between 40 degrees and 50 degrees, or about 45 degrees.

In various embodiments, the plurality of effusion holes 207 may further include a plurality of tangential effusion holes 214. The tangential effusion holes 214 may include a tangential inlet 216 defined by the second surface 203 and a tangential outlet 217 defined by the first surface 201. The tangential effusion holes 214 may extend tangentially relative to the first plurality of effusion holes 202 and the second plurality of effusion holes 208. In that regard, the tangential effusion holes 214 may each form an angle 234 relative to a nearest effusion hole (e.g., the tangential effusion hole 214 may form the angle 234 relative to an effusion hole 232) that is between 60 degrees and 120 degrees, between 80 degrees and 100 degrees, or about 90 degrees. In various embodiments, the tangential outlet 217 of the tangential effusion holes 214 may be aligned with an inlet 236 of a corresponding effusion hole 232. In various embodiments, the tangential outlet 217 may be located an equal distance from the dilution hole 200 as the inlet 236 of the corresponding effusion hole 232.

By staggering the first plurality of effusion holes 202 and the second plurality of effusion holes 208 around the dilution hole 200, cooling of the panel 150 at locations proximate to the dilution hole 200 is more evenly distributed relative to other cooling designs. Additionally, inclusion of the tangential effusion holes 214 provides cooling of the panel 150 near the first plurality of effusion holes 202 and the second plurality of effusion holes 208, thus further evenly distributing cooling at locations proximate to the dilution hole 200.

Figure 5A:
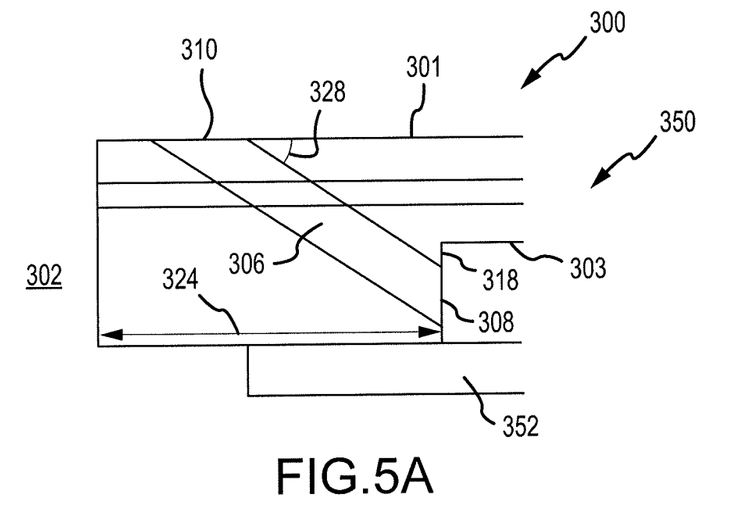
FIGS. 5A and 5B illustrate a cross-sectional view of a portion of a liner and shell assembly, in accordance with various embodiments.
Figure 5B:
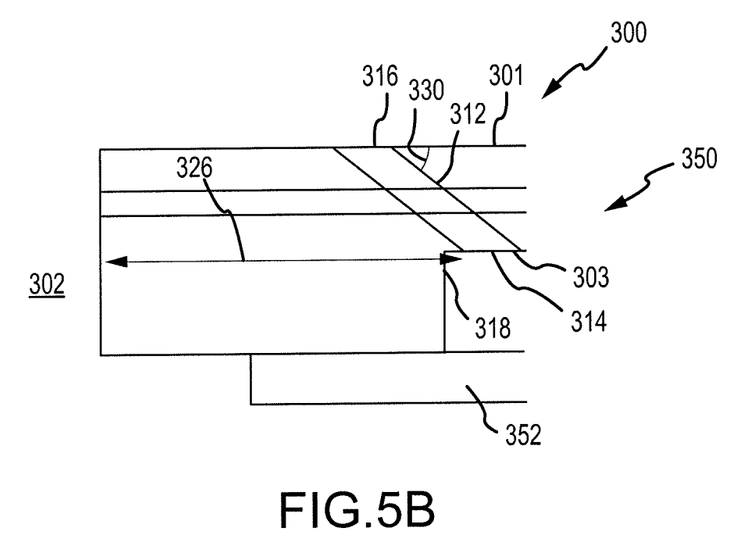
Figure 6:
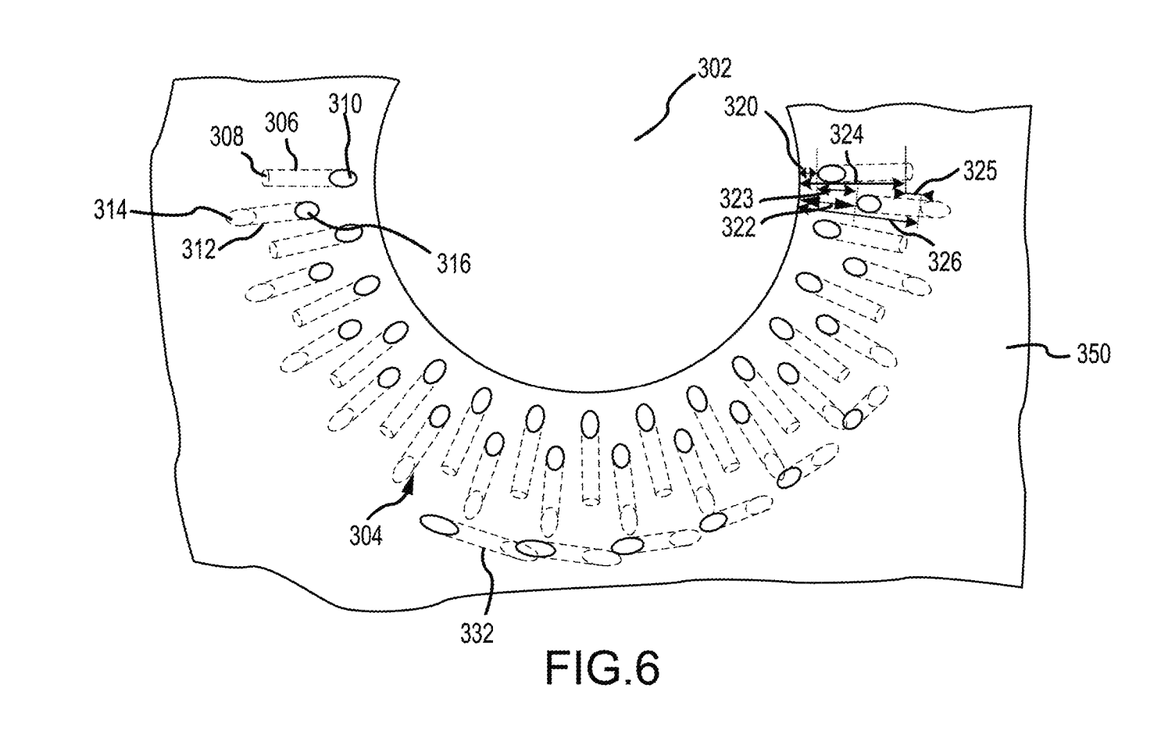
FIG. 6 illustrates a plan view of a portion of the liner and shell assembly of FIGS. 5A and 5B, in accordance with various embodiments.

Referring now to FIGS. 5A, 5B, and 6, another liner and shell assembly 300 includes a panel 350 and a shell 352. The panel 350 may define a dilution hole 302 and may include a first surface 301 and a second surface 303 that defines a grommet 318. A plurality of effusion holes 304 may extend from the second surface 303 to the first surface 301 and may therefore include inlets on the second surface 303 and outlets on the first surface 301.

The effusion holes 304 may include a first plurality of effusion holes including a first effusion hole 306, and a second plurality of effusion holes including a second effusion hole 312. The first effusion 306 hole may include an inlet 308 defined by the grommet 318 and an outlet 310 defined by the first surface 301. The second effusion hole 312 may include an inlet 314 defined by the second surface 303 and an outlet 316 defined by the first surface 301. In various embodiments, the first outlet 310 may be located a first distance 320 from the dilution hole 302, and the second outlet 316 may be located a second distance 322 from the dilution hole 302. In various embodiments, the first distance 320 may be less than the second distance 322. For example, the distances 320, 322 may be similar to the distances 224, 226 shown in FIG. 4.

In order to stagger the outlets 310, 316 of the first effusion hole 306 and the second effusion hole 312, the inlets 308, 314 of the effusion holes 306, 312 may be staggered. In particular, the inlet 308 of the first effusion hole 306 may be located a first distance 324 from the dilution hole 302, and the inlet 314 of the second effusion hole 312 may be located a second distance 326 from the dilution hole 302. In various embodiments, the first distance 324 may be less than the second distance 326 by the same amount 325 as the difference 323 between the distances 320, 322. It is noted that FIGS. 5A, 5B, and 6 are not drawn to scale. In that regard, the first effusion hole 306 may form an angle 328 with the first surface 301, and the second effusion hole 312 may form an angle 330 with the first surface 301. In various embodiments, the angles 328, 330 may be equal. For example, the angles 328, 330 may each be between 20 degrees and 45 degrees, between 30 degrees and 35 degrees, or about 32.5 degrees.

The panel 350 may further include a plurality of tangential effusion holes 332. The tangential effusion holes 332 may be aligned with the inlets 314 of the second plurality of effusion holes 312 so as not to intersect with the second plurality of effusion holes 312.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component, comprising:
a first surface and a second surface;
a dilution hole defined by the first surface and the second surface;
a grommet defined by the first surface and the second surface;
a plurality of first effusion holes located circumferentially about, at least, a portion of the dilution hole, wherein each first effusion hole of the plurality of first effusion holes has a first inlet defined entirely by a third surface of the grommet and a first outlet defined by the first surface; and
a plurality of second effusion holes interleaved circumferentially with the plurality of first effusion holes about the portion of the dilution hole, wherein each second effusion hole of the plurality of second effusion holes has a second inlet defined by the second surface and a second outlet defined by the first surface, and wherein the first outlet of each first effusion hole of the plurality of first effusion holes is located a first outlet distance from the dilution hole, wherein the second outlet of each second effusion hole of the plurality of second effusion holes is located a second outlet distance from the dilution hole, wherein the first outlet distance is less than the second outlet distance, wherein the first inlet of each of the first effusion hole of the plurality of first effusion holes is located a first inlet distance from the dilution hole, wherein the second inlet of each of the second effusion hole of the plurality of second effusion holes is located a second inlet distance from the dilution hole, wherein the first inlet distance is less than the second inlet distance, and wherein the first inlet distance is less than the second inlet distance by a same amount as a difference between the first outlet distance and the second outlet distance,
wherein each first effusion hole of the plurality of first effusion holes forms a first angle with respect to the first surface, wherein each second effusion hole of the plurality of second effusion holes forms a second angle with respect to the first surface,
wherein each first inlet of each first effusion hole of the plurality of first effusion holes is staggered between each second inlet of each second effusion hole of the plurality of second effusion holes in order to stagger each first outlet of each first effusion hole of the plurality of first effusion holes between each second outlet of each second effusion hole of the plurality of second effusion holes,
wherein the first inlet of each first effusion hole of the plurality of first effusion holes defined by the grommet is located nearer to the dilution hole than each second inlet of each second effusion hole of the plurality of second effusion holes defined by the second surface, and
wherein the first outlet of each first effusion hole of the plurality of first effusion holes and the second outlet of each second effusion hole of the plurality of second effusion holes are located on a same plane by the first surface, wherein the same plane defined by the first surface is perpendicular to a plane defined by the grommet and wherein the same plane defined by the first surface is parallel to a plane defined by the second surface.

2. The gas turbine engine component of claim 1, further comprising a tangential effusion hole having a longitudinal axis extending at a tangential angle relative to a linear longitudinal axis of at least one of a first effusion hole of the plurality of first effusion holes or a second effusion hole of the plurality of second effusion holes, the tangential angle being between 60 degrees and 120 degrees, wherein the tangential effusion hole has a tangential inlet defined by the second surface and a tangential outlet defined by the first surface.

3. The gas turbine engine component of claim 2, wherein the tangential outlet is aligned with the first inlet of the first effusion hole of the plurality of first effusion holes.

4. The gas turbine engine component of claim 1, wherein the gas turbine engine component is a panel that at least partially defines a combustion chamber of a gas turbine engine such that the first surface is exposed to combustion in the combustion chamber.

5. The gas turbine engine component of claim 1, wherein the first outlet of each first effusion hole of the plurality of first effusion holes and the second outlet of each second effusion hole of the plurality of second effusion holes are closer to the dilution hole than the first inlet of each first effusion hole of the plurality of first effusion holes and the second inlet of each second effusion hole of the plurality of second effusion holes, respectively.

6. A gas turbine engine component, comprising:
a first surface and a second surface;
a dilution hole defined by the first surface and the second surface;
a grommet defined by the first surface and the second surface;
a plurality of first effusion holes located circumferentially about, at least, a portion of the dilution hole, wherein each first effusion hole of the plurality of first effusion holes has a first inlet defined entirely by a third surface of the grommet and a first outlet defined by the first surface, wherein each first effusion hole of the plurality of first effusion holes is oriented at a first angle of between 20 degrees and 45 degrees relative to the first surface; and
a plurality of second effusion holes interleaved circumferentially with the plurality of first effusion holes about the portion of the dilution hole, wherein each second effusion hole of the plurality of second effusion holes has a second inlet defined by the second surface and a second outlet defined by the first surface, wherein each second effusion hole of the plurality of second effusion holes is oriented at a second angle of between 20 degrees and 45 degrees relative to the first surface, wherein the first outlet of each of the first effusion hole of the plurality of first effusion holes is located a first outlet distance from the dilution hole, wherein the second outlet of each of the second effusion hole of the plurality of second effusion holes is located a second outlet distance from the dilution hole, wherein the first outlet distance is less than the second outlet distance, wherein the first inlet of each of the first effusion hole of the plurality of first effusion holes is located a first inlet distance from the dilution hole, wherein the second inlet of each of the second effusion hole of the plurality of second effusion holes is located a second inlet distance from the dilution hole, wherein the first inlet distance is less than the second inlet distance, and wherein the first inlet distance is less than the second inlet distance by a same amount as a difference between the first outlet distance and the second outlet distance, wherein each first inlet of each first effusion hole of the plurality of first effusion holes is staggered between each second inlet of each second effusion hole of the plurality of second effusion holes in order to stagger each first outlet of each first effusion hole of the plurality of first effusion holes between each second outlet of each second effusion hole of the plurality of second effusion holes, wherein the first inlet of each first effusion hole of the plurality of first effusion holes defined by the grommet is located nearer to the dilution hole than each second inlet of each second effusion hole of the plurality of second effusion holes defined by the second surface, and wherein the first outlet of the first effusion hole and the second outlet of the second effusion hole are both located on a same plane defined by the first surface, wherein the same plane defined by the first surface is perpendicular to a plane defined by the grommet and wherein the same plane defined by the first surface is parallel to a plane defined by the second surface.

7. The gas turbine engine component of claim 6, further comprising a tangential effusion hole having a longitudinal axis extending at a tangential angle relative to a linear longitudinal axis of at least one of a first effusion hole of the plurality of first effusion holes or a second effusion hole of the plurality of second effusion holes, wherein the tangential angle is between 60 degrees and 120 degrees, and wherein the tangential effusion hole has a tangential inlet defined by the second surface and a tangential outlet defined by the first surface.

8. The gas turbine engine component of claim 7, wherein the tangential outlet is aligned with the first inlet of the first effusion hole of the plurality of first effusion holes.

9. The gas turbine engine component of claim 6, wherein the gas turbine engine component is a panel that at least partially defines a combustion chamber of a gas turbine engine such that the first surface is exposed to combustion in the combustion chamber.

10. The gas turbine engine component of claim 6, wherein the first outlet of the first effusion hole and the second outlet of the second effusion hole are closer to the dilution hole than the first inlet of the first effusion hole and the second inlet of the second effusion hole, respectively.

11. A liner and shell assembly, comprising:
a shell; and
a panel at least partially spaced from the shell to form a gap therebetween, the panel having:
a first surface and a second surface;
a dilution hole at least partially defined by the first surface and the second surface;
a grommet defined by the first surface and the second surface;
a plurality of first effusion holes located circumferentially about, at least, a portion of the dilution hole, wherein each first effusion hole of the plurality of first effusion holes has a first inlet and a first outlet, the first inlet defined entirely by a third surface of the grommet, the first outlet being defined by the first surface; and
a plurality of second effusion holes interleaved circumferentially with the plurality of first effusion holes about the portion of the dilution hole, wherein each second effusion hole of the plurality of second effusion holes has a second inlet and a second outlet, the second inlet being located at the gap between the panel and the shell and being defined by the second surface, the second outlet being defined by the first surface, wherein the first outlet of each first effusion hole of the plurality of first effusion holes is located a first outlet distance from the dilution hole, wherein the second outlet of each second effusion hole of the plurality of second effusion holes is located a second outlet distance from the dilution hole, wherein the first outlet distance is less than the second outlet distance, wherein the first inlet of each of the first effusion hole of the plurality of first effusion holes is located a first inlet distance from the dilution hole, wherein the second inlet of each of the second effusion hole of the plurality of second effusion holes is located a second inlet distance from the dilution hole, wherein the first inlet distance is less than the second inlet distance, and wherein the first inlet distance is less than the second inlet distance by a same amount as a difference between the first outlet distance and the second outlet distance, wherein each first effusion hole of the plurality of first effusion holes forms a first angle with respect to the first surface, wherein each second effusion hole of the plurality of second effusion holes forms a second angle with respect to the first surface, wherein each first inlet of each first effusion hole of the plurality of first effusion holes is staggered between each second inlet of each second effusion hole of the plurality of second effusion holes in order to stagger each first outlet of each first effusion hole of the plurality of first effusion holes between each second outlet of each second effusion hole of the plurality of second effusion holes, wherein the first inlet of each first effusion hole of the plurality of first effusion holes defined by the grommet is located nearer to the dilution hole than each second inlet of each second effusion hole of the plurality of second effusion holes defined by the second surface, and wherein the first outlet of the first effusion hole and the second outlet of the second effusion hole are located on a same plane defined by the first surface, wherein the same plane defined by the first surface is perpendicular to a plane defined by the grommet and wherein the same plane defined by the first surface is parallel to a plane defined by the second surface.

12. The liner and shell assembly of claim 11, wherein the panel further includes a tangential effusion hole extending at an angle of between 60 degrees and 120 degrees relative to at least one of a first effusion hole of the plurality of first effusion holes or a second effusion hole of the plurality of second effusion holes, the tangential effusion hole having a tangential inlet defined by the second surface and a tangential outlet defined by the first surface.

* * * * *